United States Patent
Ballepu et al.

(10) Patent No.: US 11,132,696 B2
(45) Date of Patent: *Sep. 28, 2021

(54) COMPUTERIZED OPTIMIZATION OF CUSTOMER SERVICE QUEUE BASED ON CUSTOMER DEVICE DETECTION

(71) Applicant: Capital One Services, LLC, McLean, VA (US)

(72) Inventors: Sharad Ballepu, Schaumburg, IL (US); Jagmeet Singh, Burr Ridge, IL (US); Gerald Serviss, Palatine, IL (US); Polerio Babao, Deerfield, IL (US); Keerthana Aravamudhan, Des Plaines, IL (US); Durga Mohan, Buffalo Grove, IL (US); Sunilkumar Kothi Reddy, Little Elm, TX (US); Steve Schroeder, Aurora, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,476

(22) Filed: Apr. 10, 2020

(65) Prior Publication Data
US 2020/0242625 A1 Jul. 30, 2020

Related U.S. Application Data

(63) Continuation of application No. 15/366,093, filed on Dec. 1, 2016, now Pat. No. 10,621,591.
(Continued)

(51) Int. Cl.
*G06Q 30/00* (2012.01)
*G06Q 10/06* (2012.01)
*G06Q 30/02* (2012.01)

(52) U.S. Cl.
CPC ...... *G06Q 30/016* (2013.01); *G06Q 10/063112* (2013.01); *G06Q 30/0203* (2013.01)

(58) Field of Classification Search
None
See application file for complete search history.

(56) References Cited

U.S. PATENT DOCUMENTS 8,056,802 B2  11/2011  Gressel et al.
8,577,053 B1  11/2013  Simon
(Continued)

OTHER PUBLICATIONS

Namiot D., Sneps-Sneppe M. (2013) Geofence and Network Proximity. Lecture Notes in Computer Science, vol. 8121. Springer, Berlin, Heidelberg. (Year: 2013).*

*Primary Examiner* — Thomas L Mansfield
(74) *Attorney, Agent, or Firm* — Troutman Pepper Hamilton Sanders LLP; Christopher J. Forstner; John A. Morrissett

(57) ABSTRACT

Various embodiments of the present disclosure provide systems, methods, and apparatus systems, methods, and apparatus that provide computerized optimization of a customer service queue based on customer device detection technologies. In an exemplary embodiment, a system that provides computerized optimization of a customer service queue may include device detection technology communicatively connected to a customer assistance server, a customer assistance client device (e.g., a customer representative device), and a customer device. Device detection technology may detect a device and transmit data associated with the detected device to a customer assistance subsystem. A customer assistance subsystem may generate an optimal representative and position within a customer service queue for the customer device. A notification about the optimal match may be transmitted to a customer and/or customer representative. And, following the assistance, a survey may
(Continued)

be conducted to update variables used to generate an optimal match.

20 Claims, 3 Drawing Sheets

Related U.S. Application Data

(60) Provisional application No. 62/261,401, filed on Dec. 1, 2015.

(56) References Cited

U.S. PATENT DOCUMENTS

| | | |
|---|---|---|
| 9,628,958 B1 | 4/2017 | McBurney |
| 2008/0004951 A1 | 1/2008 | Huang et al. |
| 2009/0005975 A1* | 1/2009 | Forstall ................ G01C 21/26 701/533 |
| 2014/0171098 A1* | 6/2014 | Marti .................... H04W 4/025 455/456.1 |
| 2014/0365334 A1 | 12/2014 | Hurewitz |
| 2015/0012829 A1 | 1/2015 | Brown et al. |
| 2015/0269642 A1 | 9/2015 | Cai et al. |

* cited by examiner

COMPUTERIZED OPTIMIZATION OF CUSTOMER SERVICE QUEUE BASED ON CUSTOMER DEVICE DETECTION

CROSS-REFERENCE TO RELATED APPLICATIONS

This application is a continuation of, and claims priority under 35 U.S.C. § 120 to, U.S. patent application Ser. No. 15/366,093, filed Dec. 1, 2016, which claims priority to U.S. Provisional Patent Application No. 62/261,401, filed Dec. 1, 2015, the entire contents of which are fully incorporated herein by reference.

FIELD OF THE DISCLOSURE

Embodiments of the present invention relate to customer service systems that cooperate with customer device detection technologies to optimize a customer service queue.

BACKGROUND OF THE DISCLOSURE

Complex resource management related to customer service queues includes numerous problems when incorporating server technology to manage the queues. For example, current systems lack client detection, client time optimization, and service time optimization. Moreover, current systems lack notifications to the customer representative to aid optimization of customer service.

These and other drawbacks exist.

SUMMARY OF THE DISCLOSURE

Various embodiments of the present disclosure provide customer service systems that cooperate with customer device detection technologies to optimize a customer service queue. In one example, a system that provides computerized optimization of a customer service queue may include device detection technology communicatively connected to a customer assistance server, a customer assistance client device (e.g., a customer representative device), and a customer device. Device detection technology may include RFID, Bluetooth, Bluetooth Low Energy (BLE), WiFi, and/or related technologies, to detect the presence of a customer device. For example, device detection technology may include an iBeacon or related device. A customer assistance subsystem may include an assistance server and processor communicatively coupled to the device detection technology. Upon detection of a customer device via device detection technology, a notification may be sent from the device detection technology to the customer assistance server/processor and/or the customer device. A notification to the customer assistance server/processor may include an identifier (e.g., device identifier, account holder identifier, and/or account identifier) such that a time of entry may be logged for the customer device. A notification to the customer assistance server/processor may include a Bluetooth-enabled light bulb that is activated upon sensing a device via device detection technology. A notification to the customer device may include a welcome message along with a survey or questionnaire to determine a type of support needed, a time constraint, a relation to any visit history, and the like. A questionnaire may dynamically change per customer and/or per location. For example, a questionnaire at one location may receive higher requests for a particular service and therefore may ask more questions geared towards that service than other locations. A questionnaire may vary by customer. For example, if a customer has previously visited a store/branch previously, the history of any interaction associated with a previous visit may be used to dynamically generate questions specific to that customer (e.g., status inquiries about a previous visit, questions regarding previously purchased/used goods and/or services, etc.).

A customer assistance server/processor may receive responses to the questionnaire from the customer device and may store the responses in a customer assistance database that is communicatively connected to the customer assistance subsystem associated with the assistance server/processor. A customer assistance database may store customer questionnaire responses, customer account data, customer representative skills, customer representative schedules, customer representative device flag, and/or customer device flag. A customer representative device flag may indicate whether the customer representative associated with the device is already assisting another customer, a number of customers in a queue associated with a customer representative device, and/or the presence or absence of a customer representative associated with a customer representative device. A customer device flag may indicate the presence or absence of a customer device associated with a customer.

Upon receiving a response from a customer device, a customer assistance subsystem (including the assistance server/processor) may use the responses, customer account data, customer representative skills, customer representative schedules, customer representative device flag, and/or customer device flag to optimally match a customer representative device associated with a customer representative to a customer device associated with a customer. Once a match is generated, an alert may be transmitted to an assigned customer representative device. An alert may include a customer data (e.g., name, picture, account information, and the like) and/or assistance data (e.g., responses to questionnaire, customer device flag, and the like).

Once the matched customer representative associated with a customer representative device is available to assist the matched customer associated with the customer device, a notification is transmitted to the customer device indicating that the customer representative is available. The notification may include customer representative data (customer representative name, picture, and/or location within a service area).

Following a particular customer service interaction, a customer representative device may transmit a notification that the interaction is complete to the customer assistance server/processor. A notification may trigger the customer assistance server/processor to transmit a subsequent customer assignment to the customer representative device, an interaction survey to the previously assisted customer associated with a customer device and/or the customer representative device associated with a customer representative, and/or completion data to the database for storage.

An interaction survey may include questions regarding the service associated with the matched customer device and customer representative device. The interaction survey may inquire about a subject matter associated with the assistance, a level of skill associated with a customer representative, queue time, wait time, service time, and/or the like. The responses may be stored in the customer assistance database, where they may be used to calculate future matches between customer representative devices and customer devices.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems, methods, and devices that provide computerized optimization of a customer service queue based on customer device detection technologies according to embodiments of the disclosure. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. The disclosure is not intended to be limited to financial institutions only. For example, a financial institution and customer service representatives assisting account holders of a financial institution are examples of a company and customer service representatives assisting customers of the company, respectively.

The use of "mobile device" in the examples throughout this application is only by way of example, and providing computerized optimization of a customer service queue based on customer device detection technologies may also be used with personal computers, tablet, gaming system, television, wearables or any other device capable of interacting with device detection technologies and/or customer assistance subsystem as described herein.

According to the various embodiments of the present disclosure, systems, methods, and devices provide computerized optimization of a customer service queue based on customer device detection technologies. Such embodiments may include, for example, notifications and/or alerts transmitted and/or received to and/or from a customer device, a customer representative device, and/or a customer assistance subsystem. Notifications and alerts may be provided in the form of a push notification, a text, a voice message, and/or application notification such as those associated with mobile banking applications. A notification to the customer assistance sever/processor may include a Bluetooth-enabled light bulb that is activated upon sensing a device via device detection technology. In various embodiments, providing computerized optimization of a customer service queue based on customer device detection technologies may be employed using a network environment, such as a Bluetooth network, a Bluetooth mesh network, a WiFi network, an Internet network, a cellular network and/or the like.

Figure 1:
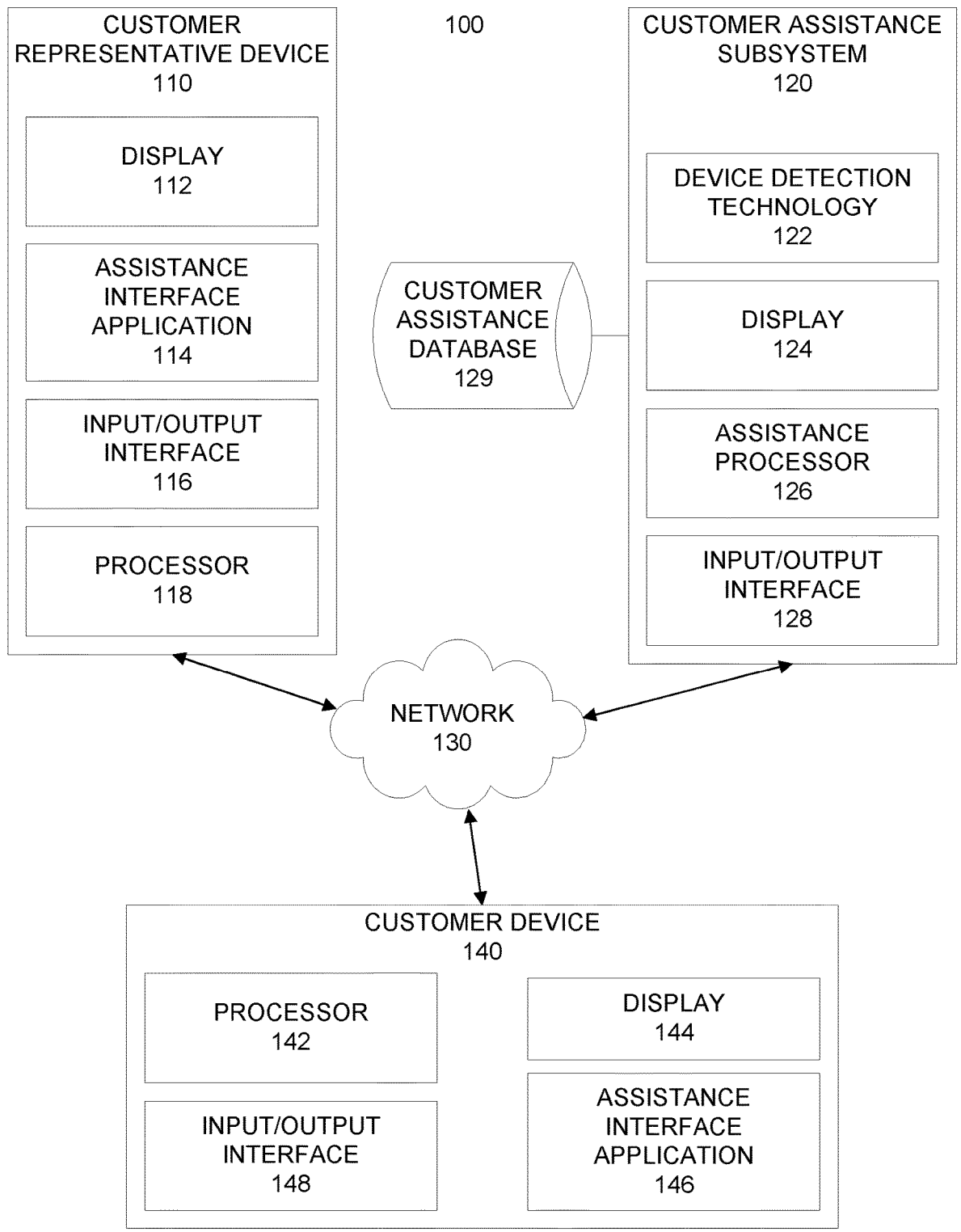
FIG. 1 depicts an example system that provides computerized optimization of a customer service queue based on customer device detection technologies according to embodiments of the disclosure.

FIG. 1 depicts an exemplary system 100 that provides computerized optimization of a customer service queue based on customer device detection technologies. As shown in FIG. 1, an example system 100 may include a customer representative device 110, a customer assistance subsystem 120, and a customer device 140 connected over a network 130.

For example, network 130 may be one or more of a wireless network, a wired network or any combination of wireless network and wired network. For example, network 130 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 130 may include, without limitation, telephone lines, fiber optics, IEEE Ethernet 902.3, a wide area network ("WAN"), a local area network ("LAN"), a wireless personal area network ("WPAN"), or a global network such as the Internet. Also network 130 may support an Internet network, a wireless communication network, a cellular network, or the like, or any combination thereof. Network 130 may further include one network, or any number of the example types of networks mentioned above, operating as a stand-alone network or in cooperation with each other. Network 130 may utilize one or more protocols of one or more network elements to which they are communicatively coupled. Network 130 may translate to or from other protocols to one or more protocols of network devices. Although network 130 is depicted as a single network, it should be appreciated that according to one or more embodiments, network 130 may comprise a plurality of interconnected networks, such as, for example, the Internet, a service provider's network, a cable television network, corporate networks, and home networks.

Customer representative device 110, customer assistance subsystem 120, and/or customer device 140 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Customer representative device 110, customer assistance subsystem 120, and/or customer device 140 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Customer representative device 110, customer assistance subsystem 120, and/or customer device 140 may include at least one central processing unit (CPU), which may be configured to execute computer program instructions to perform various processes and methods. Customer representative device 110, customer assistance subsystem 120, and/or customer device 140 may include data storage (e.g., data storage 129), including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Customer representative device 110, customer assistance subsystem 120, and/or customer device 140 may further include, for example, a processor, which may be several processors, a single processor, or a single device having multiple processors. Although depicted as single elements, it should be appreciated that according to one or more embodiments, customer representative device 110, customer assistance subsystem 120, and/or customer device 140 comprise a plurality of customer representative devices 110, customer assistance subsystems 120, and/or customer devices 140.

Customer assistance subsystem 120 may include systems associated with, for example, a company. For example, a company may include a banking service company such as Capital One®, Bank of America®, Citibank®, Wells Fargo®, Sun Trust, various community banks, and the like, as well as a number of other financial institutions such as Visa®, MasterCard®, and AmericanExpress® that issue credit and/or debit cards, for example, as transaction cards. Customer assistance subsystem 120 may include and/or be connected to one or more backend computer systems and networks. For example, where a company includes a financial institution, a backend system may include a system that stores account information, issues transaction cards, and/or processes transactions.

Customer assistance subsystem 120 may include device detection technology 122, a display 124, an assistance processor 126, an input/output interface 128, and/or a database 129. Device detection technology 122 may utilize RFID, Bluetooth, Bluetooth Low Energy (BLE), WiFi, and/or related technologies, to detect the presence of a customer device. For example, device detection technology 122 may include an iBeacon, a network element that detects when a new device connects to a known network (e.g., Internet network), a Bluetooth-enabled lightbulb, and/or the like. A display 124 may include an display screen, a touch screen, an e-ink display, and/or the like. A display 124 also may include for example output devices, such as a printer, display screen (e.g., monitor, television, and the like), speakers, projector, a Bluetooth-enabled lightbulb, and the like.

An assistance processor 126 may be incorporated into a server. Assistance processor 126 may be a specifically-programmed process storing computer-readable instructions that, when executed, perform a computerized optimization of a customer service queue based on data received via customer device detection technologies, customer devices, and/or data stored in customer assistance database 129 as described herein. Input/output interface 128 may provide an interface (e.g., application program interface ("API")) to communicate with a customer device 140 and/or a customer representative device 110. Input/output interface 128 also may include for example, I/O devices, which may be configured to provide input and/or output (e.g., keyboard, mouse, display, speakers, printers, modems, network cards, etc.). Input/output interface 128 also may include antennas, network interfaces that may provide or enable wireless and/or wire line digital and/or analog interface to one or more networks, such as network 130, over one or more network connections, a power source that provides an appropriate alternating current (AC) or direct current (DC) to power one or more components of customer assistance subsystem 120, and a bus that allows communication among the various components of customer assistance subsystem 120.

Although not shown, processor 126 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

A customer device 140 may be any device capable communicating via a network with customer assistance subsystem 120, including device detection technology 122. For example, customer device 140 could be an iPhone, iPod, iPad from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

Customer device 140 may include for example, a processor 142, a display 144, an assistance interface application 146, and/or an input/output interface 148. A processor 142 may include, for example, a microprocessor programmed to perform the various functions described herein. Processor 142 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

A display 144 may include an display screen, a touch screen, an e-ink display, and/or the like. A display 144 also may include for example output devices, such as a printer, display screen (e.g., monitor, television, and the like), speakers, projector, and the like. An assistance interface application 146 may include programmed hardware components (e.g., memory, circuitry) that may interact with input/output interface 148 to transmit and/or receive data to and/or from other system components. Assistance interface application 146 may include a company-specific assistance interface application, such as a company's mobile application, that interacts with a customer assistance subsystem 120 via an API.

Assistance interface application may also request and receive proximity data from a device detection technology 122 indicating a proximity of the customer device 140 to a customer assistance subsystem 120. Proximity data may include, for example, an existence of a connection, signal strength associated with the connection, response time data, and the like. Proximity data may use the triangulation of beacons to identify the approximate location of a customer device.

Input/output interface 148 may provide an interface (e.g., application program interface ("API")) to communicate with a customer assistance subsystem 120 and/or a customer representative device 110. Input/output interface 148 also may include for example, I/O devices, which may be configured to provide input and/or output (e.g., keyboard, mouse, display, speakers, printers, modems, network cards, etc.). Input/output interface 148 also may include antennas, network interfaces that may provide or enable wireless and/or wire line digital and/or analog interface to one or more networks, such as network 130, over one or more network connections, a power source that provides an appropriate alternating current (AC) or direct current (DC) to power one or more components of customer device 140, and a bus that allows communication among the various components of customer device 140.

Input/output interface 148 may include a Bluetooth module or chipset with a Bluetooth transceiver, a chip, and an antenna. The transceiver may transmit and receive information via the antenna and an interface. The chip may include a microprocessor that stores and processes information specific to a piconet and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the customer device 140 (e.g., The Android platform, the iOS platform). Using a Bluetooth API, an application stored on a customer device 140 or the device may be able to scan for other Bluetooth devices (e.g., an iBeacon), query the local Bluetooth adapter for Bluetooth devices, establish RFCOMNI channels, connect to other devices through service discovery, transfer data to and from other devices or a transaction card and manage multiple connections. A Bluetooth API used in the methods, systems, and devices described herein may include an API for Bluetooth Low Energy (BLE) to provide significantly lower power consumption and allow a customer device 140 to communicate with BLE devices that have low power requirements.

Input/output interface 148 may also include an NFC antenna and secure element (SE). The SE may be a hardware chip specially designed to be tamper proof In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a customer account, such as, for example, an account number, transaction data, and/or the like. The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services.

Input/output interface 148 may enable Industry Standard NFC Payment Transmission. For example, the input/output interface 148 may enable two loop antennas to form an air-core transformer when placed near one another by using magnetic induction. Input/output interface 148 may operate at 13.56 MHz or any other acceptable frequency. Also, input/output interface 148 may provide for a passive communication mode, where the initiator device provides a carrier field, permitting answers by the target device via modulation of existing fields. Additionally, input/output interface 148 also may provide for an active communication mode by allowing alternate field generation by the initiator and target devices.

Input/output interface 148 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output interface 148 may be capable of utilizing standardized transmission protocols, for example but not by way of limitation, ISO/IEC 14443 A/B, ISO/IEC 18092, MiFare, FeliCa, tag/smartcard emulation, and the like. Also, input/output interface 148 may be able to utilize transmission protocols and methods that are developed in the future using other frequencies or modes of transmission. Input/output interface 148 may also be backwards-compatible with existing techniques, for example RFID. Also, the system may support transmission requirements to meet new and evolving standards including internet based transmission triggered by NFC.

Customer device 140 may also include various software components to facilitate customer assistance optimization as described herein. For example, user device 140 may include an operating system such as, for example, the iOS operating system from Apple, the Google Android operating system, and the Windows Mobile operating system from Microsoft. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

A customer representative device 110 may be any device capable communicating via a network with customer assistance subsystem 120. For example, customer representative device 110 could be an iPhone, iPod, iPad from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

Customer representative device 110 may include, for example, a self-service kiosk. Where a customer representative device 110 includes a self-service kiosk, a question in a questionnaire or survey sent to a customer device may include an option for a customer to select a self-service kiosk as the customer representative device 110. A customer device 140 may include a network-enabled display (e.g., a WiFi-enabled display). When a customer device 140 submits a request for service, a response to a questionnaire or survey, and or other customer service-related request, a particular self-service kiosk as a customer representative device 110 may be assigned to a particular customer device 140. Customer device 140 identification information may be transmitted from the customer device 140 to the customer service device 110 via a network (e.g., WiFi, RFID, Bluetooth, NFC, etc.). In this manner, the customer service device 110 may display customer identification information. For example, a self-service kiosk as a customer service device 110 may display a phone number, email address, name, or other customer identifier received from a customer device 140 via a network so that the customer identifier may be displayed on a display associated with the kiosk to alert a customer when the kiosk is available for that particular customer.

Customer representative device 110 may include for example, a display 112, an assistance interface application 114, an input/output interface 116, and/or a processor 1108. A processor 118 may include, for example, a microprocessor programmed to perform the various functions described herein. Processor 118 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

A display 112 may include an display screen, a touch screen, an e-ink display, and/or the like. A display 112 also may include for example output devices, such as a printer, display screen (e.g., monitor, television, and the like), speakers, projector, and the like. An assistance interface application 114 may include programmed hardware components (e.g., memory, circuitry) that may interact with input/output interface 116 to transmit and/or receive data to and/or from other system components. Assistance interface application 114 may include a company-specific assistance interface application, such as a company customer service application, that interacts with a customer assistance subsystem 120 via an API.

Assistance interface application 114 may also request and receive proximity data from a device detection technology 122 indicating a proximity of the customer device 140. Proximity data may include, for example, an existence of a connection, signal strength associated with the connection, response time data, and the like. Proximity data may use the triangulation of beacons to identify the approximate location of the customer device 140. Proximity data may relay data to customer representative device 110 indicative of a location of a customer device 140.

Input/output interface 116 may provide an interface (e.g., application program interface ("API")) to communicate with a customer assistance subsystem 120 and/or a customer device 140. Input/output interface 116 also may include for example, I/O devices, which may be configured to provide input and/or output (e.g., keyboard, mouse, display, speakers, printers, modems, network cards, etc.). Input/output interface 116 also may include antennas, network interfaces that may provide or enable wireless and/or wire line digital and/or analog interface to one or more networks, such as network 130, over one or more network connections, a power source that provides an appropriate alternating current (AC) or direct current (DC) to power one or more components of customer representative device 110, and a bus that allows communication among the various components of customer representative device 110.

Input/output interface 116 may include a Bluetooth module or chipset with a Bluetooth transceiver, a chip, and an antenna. The transceiver may transmit and receive information via the antenna and an interface. The chip may include a microprocessor that stores and processes information specific to a piconet and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the customer representative device 110 (e.g., The Android platform, the iOS platform). A Bluetooth API used in the methods, systems, and devices described herein may include an API for Bluetooth Low Energy (BLE) to provide significantly lower power consumption and allow a customer representative device 110 to communicate with BLE devices that have low power requirements.

Input/output interface 116 may also include an NFC antenna and secure element (SE). The SE may be a hardware chip specially designed to be tamper proof In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a customer account, such as, for example, an account number, transaction data, and/or the like. The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services.

Input/output interface 116 may enable Industry Standard NFC Payment Transmission. For example, the input/output interface 116 may enable two loop antennas to form an air-core transformer when placed near one another by using magnetic induction. Input/output interface 116 may operate at 13.56 MHz or any other acceptable frequency. Also, input/output interface 116 may provide for a passive communication mode, where the initiator device provides a carrier field, permitting answers by the target device via modulation of existing fields. Additionally, input/output interface 116 also may provide for an active communication mode by allowing alternate field generation by the initiator and target devices.

Input/output interface 116 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output interface 116 may be capable of utilizing standardized transmission protocols, for example but not by way of limitation, ISO/IEC 14443 A/B, ISO/IEC 18092, MiFare, FeliCa, tag/smartcard emulation, and the like. Also, input/output interface 148 may be able to utilize transmission protocols and methods that are developed in the future using other frequencies or modes of transmission. Input/output interface 116 may also be backwards-compatible with existing techniques, for example RFID. Also, the system may support transmission requirements to meet new and evolving standards including internet based transmission triggered by NFC.

Customer representative device 110 may also include various software components to facilitate customer assistance optimization as described herein. For example, customer representative device 110 may include an operating system such as, for example, the iOS operating system from Apple, the Google Android operating system, and the Windows Mobile operating system from Microsoft. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Figure 2:
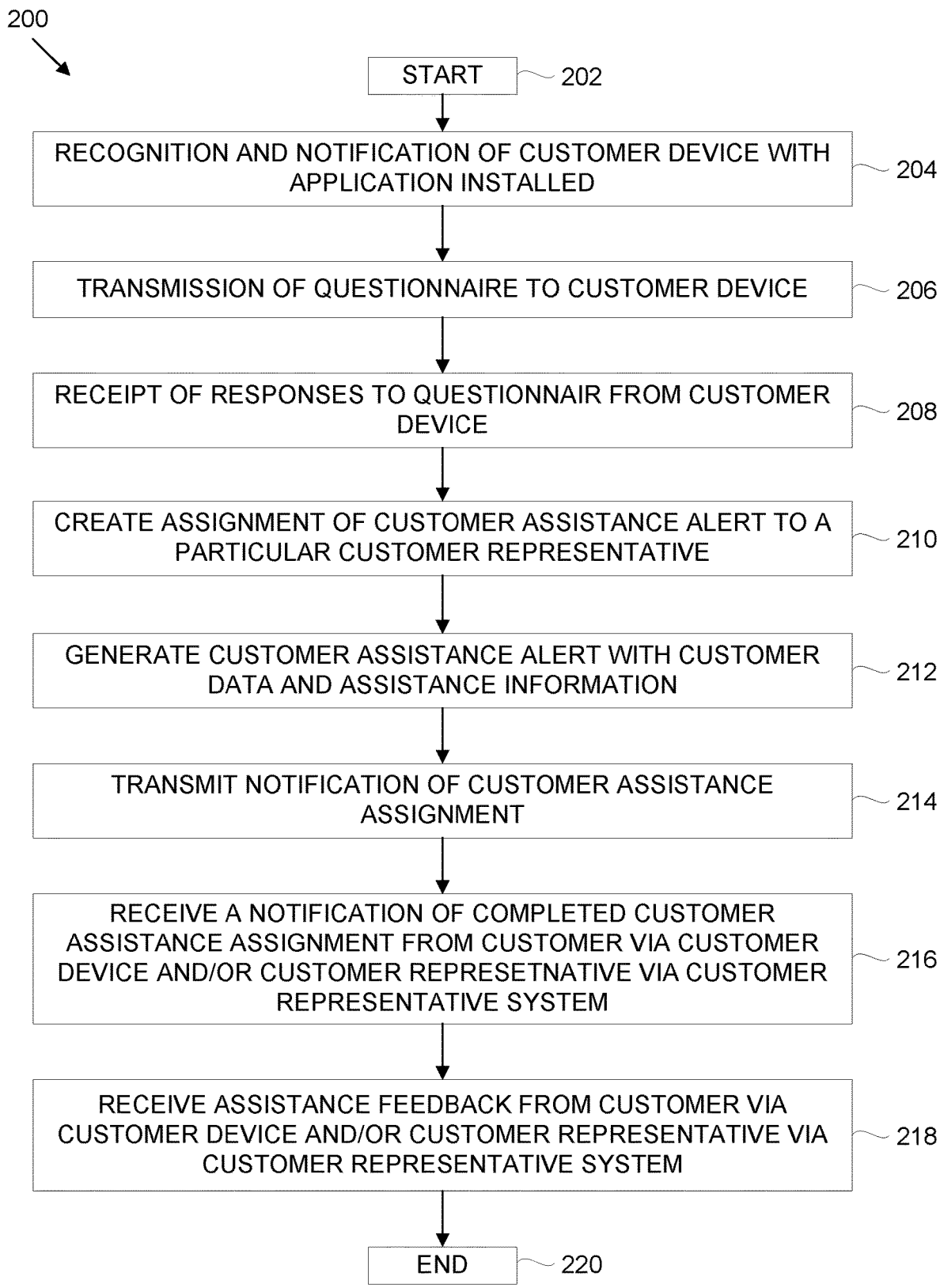
FIG. 2 depicts an example method for providing computerized optimization of a customer service queue based on customer device detection technologies according to embodiments of the disclosure.

FIG. 2 depicts an exemplary method 200 employed by the system components described herein to provide computerized optimization of a customer service queue based on customer device detection technologies. Method 200 may begin at block 202.

At block 204, a customer device may be detected at a company location. For example, customer device may be detected via device detection technology, such as device detection technology 122. As mentioned herein, device detection technology may include RFID, Bluetooth, Bluetooth Low Energy (BLE), WiFi, and/or related technologies, to detect the presence of a customer device. For example, device detection technology may include an iBeacon or related device. A customer assistance subsystem may include an assistance server and processor communicatively coupled to the device detection technology.

In block 204, upon detection of a customer device via device detection technology, a notification may be sent from the device detection technology to the customer assistance server/processor. A notification to the customer assistance server/processor may include an identifier (e.g., device identifier, account holder identifier, and/or account identifier) such that a time of entry may be logged for the customer device. A notification may also include transmitting a signal to a Bluetooth-enabled lightbulb stationed at or near a customer service system.

In block 206, also upon detection of a customer device via device detection technology, a notification may be sent from the device detection technology to the customer device. A notification to the customer device may include a welcome message along with a survey or questionnaire to determine a type of support needed, a time constraint, a relation to any visit history, and the like. A survey or questionnaire may inquire about a type of goods or services that the customer desires, a time constraint associated with the customer, a desired appointment time associated with the customer, and/or account information associated with a customer. A survey or questionnaire may include any additional questions to optimally match a customer representative device to match to a customer device. A questionnaire may dynamically change per customer and/or per location. For example, a questionnaire at one location may receive higher requests for a particular service and therefore may ask more questions geared towards that service than other locations. A questionnaire may vary by customer. For example, if a customer has previously visited a store/branch previously, the history of any interaction associated with a previous visit may be used to dynamically generate questions specific to that customer (e.g., status inquiries about a previous visit, questions regarding previously purchased/used goods and/or services, etc.).

Alternatively, a survey/questionnaire may also be accessed via a website on a customer device. In this manner, a customer device may respond to the questionnaire in a manner to pause or cancel the questionnaire so that the customer device may access the questionnaire at a later time via a web site.

At block 208, a customer assistance server/processor may receive responses to the questionnaire from the customer device and may store the responses in a customer assistance database that is communicatively connected to the customer assistance subsystem associated with the assistance server/processor. A customer assistance database may store customer questionnaire responses, customer account data, customer representative skills, customer representative schedules, customer representative device flag, and/or customer device flag. A customer representative device flag may indicate whether the customer representative associated with the device is already assisting another customer, a number of customers in a queue associated with a customer representative device, and/or the presence or absence of a customer representative associated with a customer representative device. A customer device flag may indicate the presence or absence of a customer device associated with a customer.

At block 210, upon receiving a response from a customer device, a customer assistance subsystem (including the assistance server/processor) may use the responses, customer account data, customer representative skills, customer representative schedules, customer representative device flag, and/or customer device flag to optimally match a customer representative device associated with a customer representative to a customer device associated with a customer. Once a match is generated, an alert may be generated to an assigned customer representative device in block 212. An alert may include a customer data (e.g., name, picture, account information, and the like) and/or assistance data (e.g., responses to questionnaire, customer device flag, and the like). At block 214, the alert may be transmitted to the matched customer representative device using input/output interfaces, APIs, and a network.

Also in block 214, once the matched customer representative associated with a customer representative device is available to assist the matched customer associated with the customer device, a notification is also transmitted to the customer device indicating that the customer representative is available. The notification may include customer representative data (customer representative name, picture, and/or location within a service area). Assistance may include using the responses, customer account data, and/or the like to provide necessary assistance. For example, where customer account data indicates that a customer is eligible for a coupon or promotion, a customer representative device may indicate the eligibility and/or provide the coupon and/or promotion to the customer and/or customer device.

Following a particular customer service interaction, in block 216, a customer representative device may transmit a notification that the interaction is complete to the customer assistance server/processor. A notification may trigger the customer assistance server/processor to transmit a subsequent customer assignment to the customer representative device, an interaction survey to the previously assisted customer associated with a customer device and/or the customer representative device associated with a customer representative, and/or completion data to the database for storage.

In block 218, an interaction survey may be transmitted to a customer representative device and/or a customer device. An interaction survey may include questions regarding the service associated with the matched customer device and customer representative device. The interaction survey may inquire about a subject matter associated with the assistance, a level of skill associated with a customer representative, queue time, wait time, service time, and/or the like. The responses may be stored in the customer assistance database, where they may be used to calculate future matches between customer representative devices and customer devices.

At block 220, the method may end.

Figure 3:
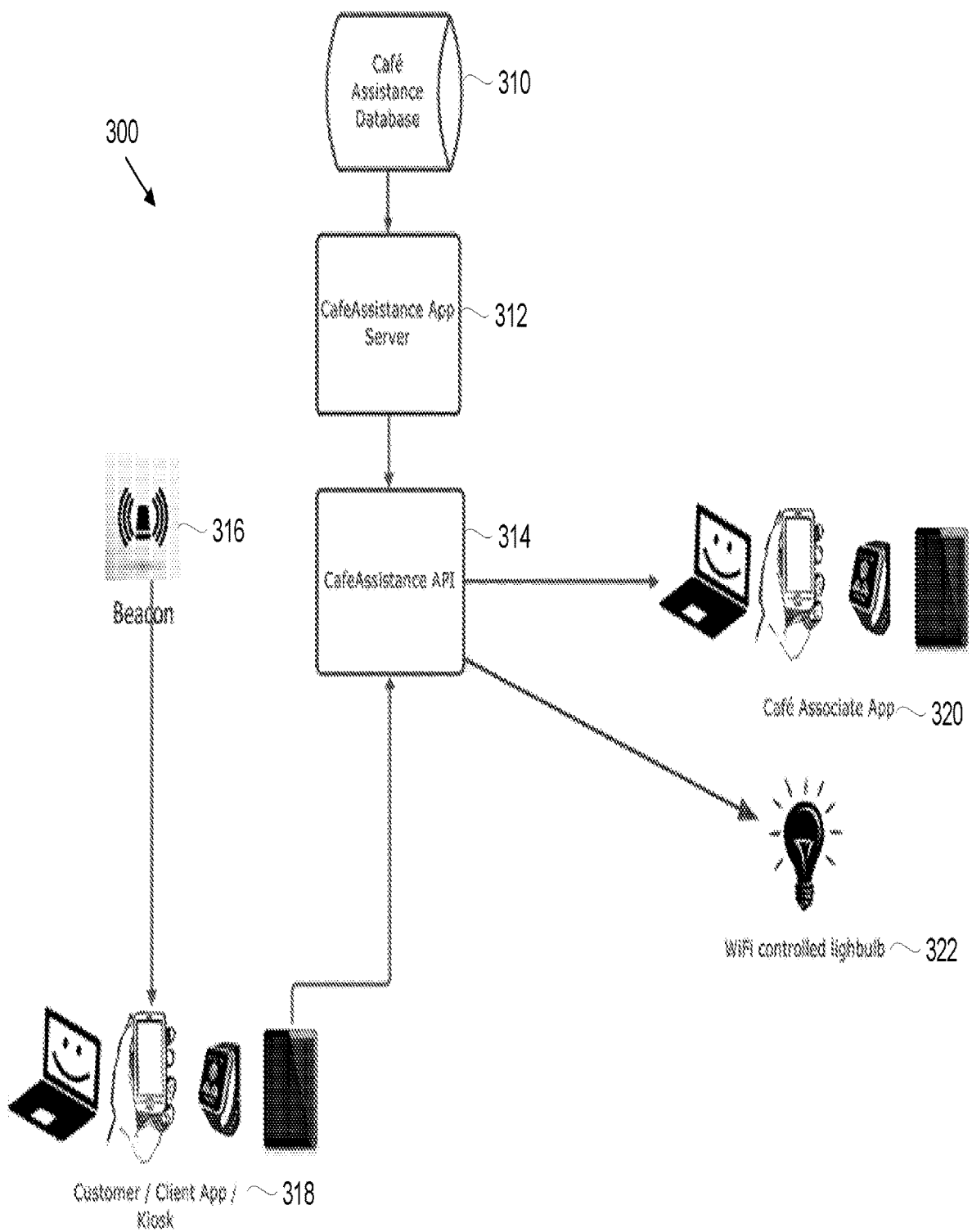
FIG. 3 depicts an example system that provides computerized optimization of a customer service queue based on customer device detection technologies according to embodiments of the disclosure.

FIG. 3 depicts an exemplary system 300 that provides computerized optimization of a customer service queue based on customer device detection technologies. System 300 may include a café assistance database 310, a café assistance app server 312, a café assistance API 314, a beacon 316, a customer device with customer app 318, a café associate device with café associate app 320, and/or a WiFi controlled light 322. Café assistance database 310 may include hardware and/or software technologies similar to database 129. Café assistance app server 312 may include hardware and/or software technologies similar to customer assistance subsystem 120. A café assistance API may include hardware and/or software technologies similar to the input/output interfaces described in FIG. 1. A beacon 316 may include hardware and/or software technologies similar to device detection technology 122. A customer device with customer app 318 may include hardware and/or software technologies similar to customer device 140. A café associated device with café associate app may include hardware and/or software technologies similar to customer representative device 110. A WiFi controlled light 322 may be a stand-alone light, a light incorporated into a customer assistance subsystem via a display, a light incorporated into a customer device via a display, and/or a light incorporated into a customer representative device via a display. A WiFi controlled light 322 may receive data to illuminate a particular color illustrating whether a match has been made, whether a customer and/or customer representative are busy, and/or the like.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A customer assistance system comprising:
   a processor configured to execute instructions that when executed causes the processor to:
      determine a current location of a customer, based on at least one customer device of the customer, using proximity data from at least one device detection unit;
      dynamically determine questions to be included in a questionnaire for the customer based on customer data, customer representative data, and historical assistance data;
      transmit the questionnaire to the at least one customer device based on the current location of the at least one customer device, the questionnaire comprising the dynamically determined questions;
      receive, from the at least one customer device, responses to the questionnaire;
      generate optimal match data associated with an optimal match between one of a plurality of customer representatives and the customer, wherein the optimal match is determined based on at least the customer data, the customer representative data, the historical assistance data, and the responses to the questionnaire; and
      transmit the generated optimal match data to one of a plurality of customer representative devices associated with the respective customer representative identified in the optimal match, wherein the generated optimal match data comprises customer identification data.

2. The system of claim 1, wherein the optimal match is generated based on the proximity data by comparing the proximity data to a proximity threshold.

3. The system of claim 2, wherein the proximity data comprises at least one of: a signal strength and a response time.

4. The system of claim 1, wherein the optimal match is generated based on the proximity data by:
   calculating a proximity of the customer device by triangulating the proximity data received from at least three device detection units; and
   comparing the proximity to a proximity threshold.

5. The system of claim 1, further comprising an antenna component configured to connect with a plurality of customer representative devices associated with a plurality of customer representatives and at least one customer device associated with at least one customer, wherein the antenna component comprises a Bluetooth antenna and a BLE interface.

6. The system of claim 5, wherein the at least one device detection unit receives detection data from the customer device by:
   generating a detection data packet;
   transmitting the detection data packet over an advertising channel using the Bluetooth antenna and the BLE interface; and
   receiving detection data in response to the transmitted detection data packet.

7. The system of claim 6, wherein transmitting the detection data packet generates a push notification on the customer device and the detection data comprises a response to the push notification.

8. The system of claim 7, wherein the push notification comprises at least one of: a welcome message, a survey, a questionnaire, a time constraint, and customer history data.

9. The system of claim 7, wherein the detection data packet comprises a time constraint associated with the response to the detection data packet.

10. The system of claim 8, wherein the push notification comprises a questionnaire dynamically generated for the customer device based on at least one of: the historical assistance data and the customer history data.

11. The system of claim 8, wherein the optimal match is further generated based on the detection data.

12. The system of claim 8, wherein the response to the push notification is stored in a database.

13. The system of claim 1, wherein customer data comprises a customer device identifier and customer account data; and wherein customer representative data comprises customer representative skill data, customer representative schedule data, and customer representative queue data; and wherein historical assistance data comprises previously received detection data.

14. The system of claim 13, wherein the optimal match generated based on an optimal match between one of the customer representatives and the customer is generated by:
   matching at least one of:
      customer data with customer representative data and historical assistance data with customer representative data; and
      minimizing customer representative queue data while remaining within a constraint of the customer representative schedule data.

15. The system of claim 1, wherein the transmitted optimal match data generates a push notification on the one of the plurality of customer representative devices, and wherein the push notification displays the customer identification data.

16. The system of claim 15, wherein the customer identification data comprises a customer name, a customer image, and customer account data.

17. A customer assistance system comprising:
   an input/output interface comprising an antenna component configured to connect with a plurality of customer representative devices associated with a plurality of customer representatives and at least one customer device associated with at least one customer;

a database configured to store customer data, customer representative data, and historical assistance data; and a processor configured to execute instructions that when executed causes the processor to:

determine a current location of a first customer device of at least one customer device using proximity data from at least one device detection unit;

dynamically determine questions to be included in a questionnaire for a first customer associated with the first customer device based on customer data, customer representative data, and historical assistance data;

transmit the questionnaire to the first customer device based on the current location of the at least one customer device, the questionnaire comprising the dynamically determined questions;

receive, from the first customer device, responses to the questionnaire;

generate an optimal match between a first customer representative of the plurality of customer representatives and a first customer of the at least one customer;

transmit a first notification to the first customer device, the first notification comprising an identity of a first customer representative associated with a first customer representative device and an indication that the first customer representative is available to provide assistance based on the optimal match;

transmit a second notification to the first customer representative device, the second notification comprising an identity and location information associated with the first customer.

18. The system of claim 17, wherein the first notification further comprises a member selected from the group of a photo identifier of the first customer and a location of the first customer within a service area associated with the first customer representative.

19. A method for optimally matching a first customer representative device of a plurality of customer representative devices with a first customer device, the method comprising:

determining that a first customer device is within a predetermined proximity of the plurality of customer representative devices;

dynamically determining questions to be included in a questionnaire for a first customer associated with the first customer device based on customer data, customer representative data, and historical assistance data;

transmitting the questionnaire to the first customer device based on the first customer device being within the predetermined proximity of the plurality of customer representative devices, the questionnaire comprising the dynamically determined questions;

receiving, from the first customer device, responses to the questionnaire;

generating an optimal match between a first customer representative associated with the first customer representative device and the first customer;

transmitting a first notification to the first customer device, the first notification comprising an identity of the first customer representative and an indication that the first customer representative is available to provide assistance based on the optimal match;

transmit a second notification to the first customer representative device, the second notification comprising an identity and location information associated with the first customer.

20. The method of claim 19, wherein the predetermined proximity is determined based on geolocation data associated with the first customer device and the questionnaire is pushed to the first customer device based on the geolocation data indicating that the first customer device is within the predetermined proximity.

* * * * *